United States Patent [19]
Robertson

[11] Patent Number: 5,854,954
[45] Date of Patent: Dec. 29, 1998

[54] LIGHT TIGHT CHAMBER WITH CLOSURE AND SENSOR FOR POSITION OF CLOSURE AND CASSETTE IN CHAMBER

[75] Inventor: Jeffrey Charles Robertson, Rochester, N.Y.

[73] Assignee: Eastman Kodak Company, Rochester, N.Y.

[21] Appl. No.: 620,431

[22] Filed: Mar. 22, 1996

Related U.S. Application Data

[60] Provisional application No. 60/001,515 Jul. 18, 1995.

[51] Int. Cl.$^6$ .................................................. G03B 17/02
[52] U.S. Cl. ............................ 396/535; 396/536; 396/538
[58] Field of Search ..................................... 396/207, 208, 396/209, 210, 515, 511, 512, 535, 536, 538, 543

[56] References Cited

U.S. PATENT DOCUMENTS

| | | |
|---|---|---|
| 3,266,397 | 8/1966 | Kremp ...................................... 396/207 |
| 3,364,832 | 1/1968 | Engelsmann et al. ................... 396/284 |
| 3,492,927 | 2/1970 | Thiele et al. ................................. 95/10 |
| 4,363,547 | 12/1982 | Hashimoto et al. ..................... 396/411 |
| 4,726,542 | 2/1988 | Nakayama et al. ..................... 242/186 |
| 4,783,672 | 11/1988 | Wirtz et al. ............................. 396/207 |
| 4,841,283 | 6/1989 | Bubliewicz ............................. 340/545 |
| 4,928,900 | 5/1990 | Beery ...................................... 396/207 |
| 5,105,211 | 4/1992 | Kameyama ............................. 396/536 |
| 5,159,365 | 10/1992 | Takahashi et al. ..................... 396/285 |
| 5,187,531 | 2/1993 | Ozawa et al. .......................... 355/308 |
| 5,382,992 | 1/1995 | Kawamura et al. ..................... 354/21 |
| 5,396,313 | 3/1995 | Zoltner et al. ......................... 355/206 |
| 5,550,609 | 8/1996 | Stephany ................................. 396/208 |

Primary Examiner—Eddie C. Lee
Attorney, Agent, or Firm—Charles E. Snee, III; Gordon M. Stewart

[57] ABSTRACT

Apparatus (10) for using light-sensitive web material includes a cassette chamber (12) which is closed by a closure (20) when a cassette (18) of the material has been installed. A single sensor (30, 32; 50–64) is provided to detect that the cassette is present, properly oriented and filled with the right material and that the closure is properly closed.

7 Claims, 4 Drawing Sheets

LIGHT TIGHT CHAMBER WITH CLOSURE AND SENSOR FOR POSITION OF CLOSURE AND CASSETTE IN CHAMBER

CROSS REFERENCE TO RELATED APPLICATION

Reference is made to and priority claimed from U.S. provisional application Ser. No. U.S. Ser. No. 60/001,515, filed 18 Jul. 1995, entitled LIGHT TIGHT CHAMBER WITH CLOSURE AND SENSOR FOR POSITION OF CLOSURE AND CASSETTE IN CHAMBER.

TECHNICAL FIELD

The invention concerns improvements to apparatus using light-sensitive web material, such as photographic film or paper. More particularly, the invention is related to such apparatus to which the film or material is supplied in cassettes, there thus being a need to ensure that the proper cassette has been correctly installed in a light-tight chamber before operating the apparatus.

BACKGROUND ART

In the photographic industry, it is well known to supply light-sensitive materials in cassettes which can be loaded into an associated apparatus in daylight conditions. Typically, such daylight-load cassettes have been used in apparatus such as "minilab" photographic printers, wherein the cassette contains the photographic paper needed for making photographic prints. Referring to FIG. 1, such minilab printers or similar photographic apparatus 10 usually have had a cassette chamber 12 with a plurality of locating surfaces 14, 16 for precisely locating a daylight-load cassette 18. A closure or door 20 has been pivotably attached to apparatus 10 by a hinge 22 and has been provided with suitable light-tight gaskets 24, 26 for preventing ingress of light into chamber 12 when closure 20 has been properly closed. Other light-locking elements, such as sliding doors and labyrinthine light-locking arrangements, also have been used to prevent ingress of light. Within apparatus 10, a light-lock element 28 has been included to prevent light from entering the apparatus when closure 20 has been open and a lead end 29 of web material has been threaded from the cassette through the light-lock in the familiar manner. Once cassette 18 has been properly positioned within chamber 12; lead end 29 has been threaded; and closure 20 has been closed, apparatus 10 then has been operated to extract the light-sensitive material from the cassette.

Such prior art apparatus have been controlled by electronic means which typically have included a substantial number of individual sensors to determine individually the state or position of components within the apparatus, including cassette 18 and door 20. Separate, individual sensors also have been used to detect a feature of the cassette which is indicative of the characteristics of the web material, such as film speed, when the same general type of cassette has been used to supply materials with different photographic characteristics. Thus, an apparatus of the type shown in FIG. 1 might include a first sensor to determine the open/closed state of closure 20, a second sensor to determine the presence of cassette 18, a third sensor to determine the orientation of cassette 18 and a fourth sensor to determine the type of material within the cassette. Since the costs of designing, manufacturing and operating such apparatus are increased, while the reliability of the apparatus is decreased, by large numbers of such sensors and their associated circuitry, a need has existed for reducing the number of sensors required to operate the apparatus.

SUMMARY OF THE INVENTION

The primary objective of the invention is to reduce the number of sensors required to confirm that a correct cassette has been installed and that the closure has been properly closed.

This objective is given only by way of illustrative example; thus other desirable objectives and advantages inherently achieved by the disclosed invention may occur or become apparent to those skilled in the art. Nonetheless, the scope of the invention is to be limited only by the appended claims.

An apparatus in accordance with my invention is particularly suited for using light-sensitive web material. A chamber is provided in the apparatus, for receiving a cassette of the material; and a light-tight closure is provided for the chamber. A sensor is operatively associated with the closure and a cassette for sensing that the cassette is present in the chamber and that the chamber is closed by the closure and for producing a signal. Means are included in the apparatus which are responsive to the signal to indicate either that the cassette is not present, or that the chamber is not closed, or both. This means may simply be warning light which is illuminated if the sensor fails to detect any one of the desired conditions of the cassette or closure.

The cassette may have a single, exterior feature sensed by the sensor when the cassette is installed and correctly oriented within the chamber and the chamber is closed. The feature may be positioned on the cassette in accordance with a characteristic of the light-sensitive web material. The sensor may be a micro-switch mounted on the closure, the micro-switch having an actuator arm which contacts a surface of a cassette when the chamber is closed. Alternatively, the sensor may comprise, collectively, an infrared transmitter and receiver pair, with its beam directed toward a first reflective member mounted on the closure, which redirects the beam toward a second reflective member mounted on the cassette. The transmitter and receiver pair may comprise a source of light mounted in the chamber for directing a beam from the first reflective member to the second; and means mounted in the chamber for detecting that the beam has reflected from both reflective members. In another embodiment, the sensor may comprise, collectively, a first reflective member mounted on the closure, a second reflective member mounted on the cassette and a single optical transmitter/receiver mounted in the chamber for directing a beam from the first reflective member to the second and for receiving a reflected beam. In still another embodiment, the sensor may comprise a reflective member mounted on the cassette and a single optical transmitter/receiver for directing a beam toward the reflective member and receiving a reflected beam. The cassette may have a single, external feature sensed by the sensor only when the cassette is installed, the cassette contains web material having a desired characteristic, and the chamber is closed.

A cassette in accordance with my invention is particularly suited for light-sensitive web material, the cassette being for installation in an associated apparatus which uses the material. The cassette comprises a single exterior feature detectable by the associated apparatus to confirm both proper orientation of the cassette within the apparatus and correct contents of the cassette.

The invention provides various advantages. The number of sensors to confirm the position of the closure, the orientation of the cassette and the contents of the cassette is reduced from two or three, to one. The use of a single sensor permits use of a simpler controller and control logic for the associated apparatus. The reduction in the number of sensors ensures that the associated apparatus will be more reliable since there are fewer elements to fail in operation.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENT

Figure 1:
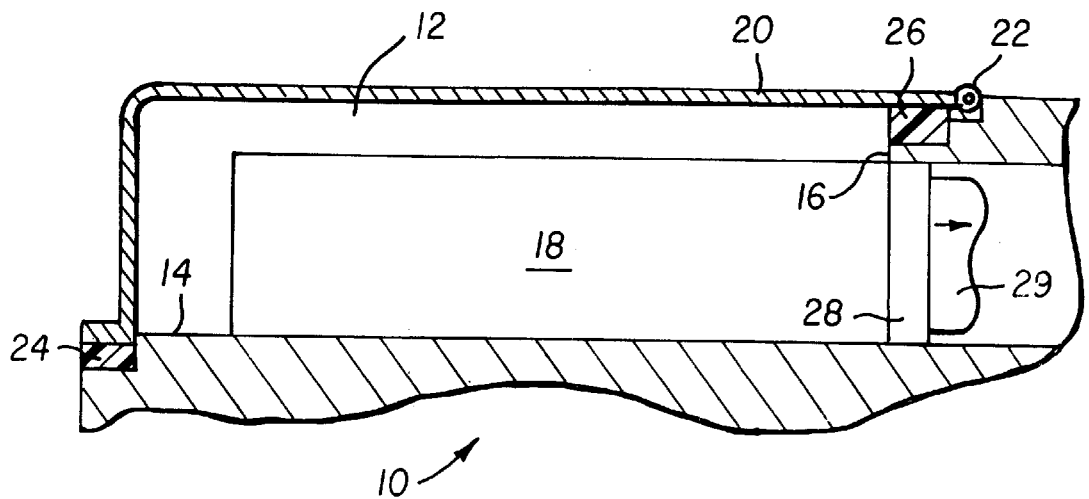
FIG. 1 shows a fragmentary sectional view of a prior art photographic apparatus embodying a cassette chamber with a hinged closure.

The following is a detailed description of the preferred embodiments of the invention, reference being made to the drawings in which the same reference numerals identify the same elements of structure in each of the several Figures.

Figure 2:
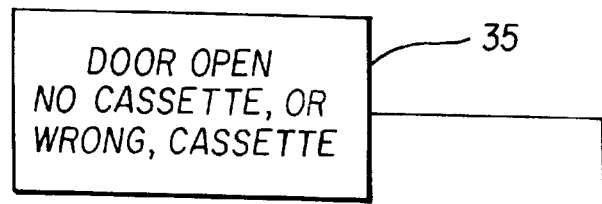
FIG. 2 shows a fragmentary sectional view of a photographic apparatus embodying such a chamber and closure, plus a sensor in accordance with the invention to detect both the presence of a cassette in the chamber and the closed position of the closure.
Figure 2:
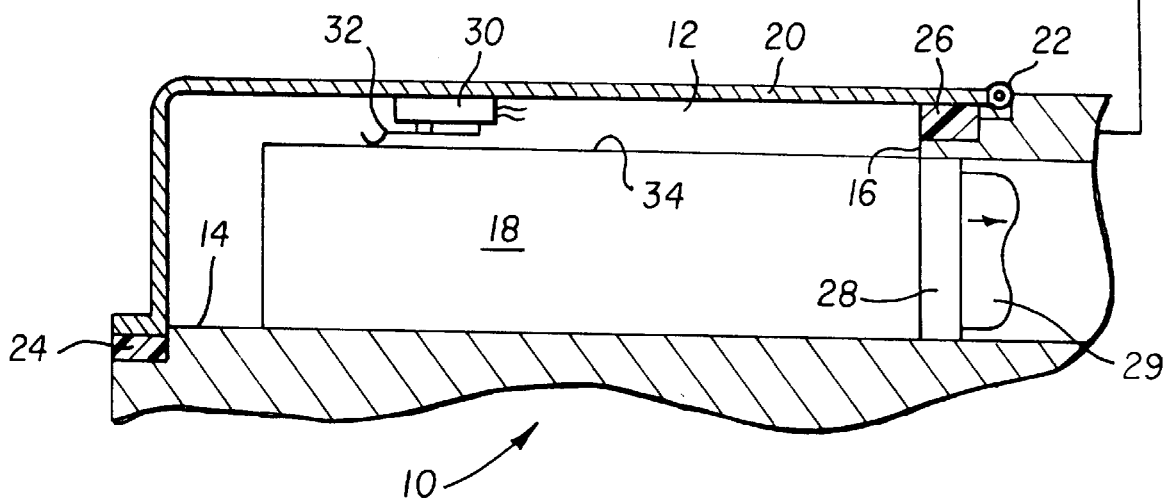

Turning to FIG. 2, the structure and function of one embodiment of the invention may be understood. An individual sensor, such as a single micro-switch 30, normally open or normally closed, is attached to an inside surface of cover 20 in a position to permit its actuator arm 32 to engage a contact surface 34 on the cassette and to be moved to close/open the switch, when cassette 18 is present in chamber 12. Thus, if cover 20 is open or cassette 18 is missing, switch 30 will not be actuated. As indicated schematically, the switch is connected to the control system of the apparatus which includes a means 35, such as a simple warning lamp, to indicate that the door is open or the cassette has not been installed or (as will be described subsequently) that the wrong cassette is present. Without further elaboration, those skilled in the art will understand that only if cassette 18 is present and cover 20 is closed will micro-switch 30 be actuated to signal the apparatus that conditions are suitable for operation.

Figure 3:
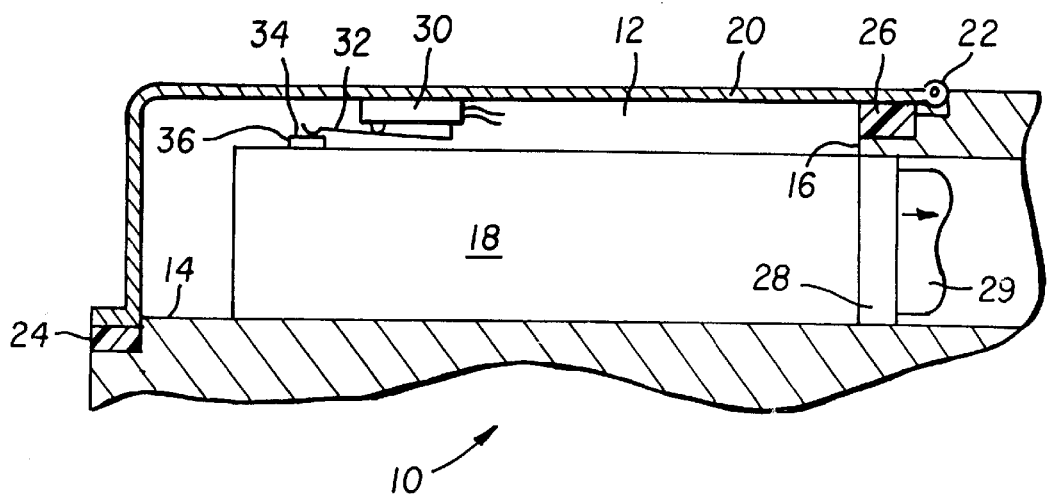
FIG. 3 shows a fragmentary sectional view of a photographic apparatus of the type shown in FIG. 2, wherein the cassette has a feature which cooperates with the sensor to detect both the presence of a cassette with a particular film type and the closed position of the closure.
Figure 4:
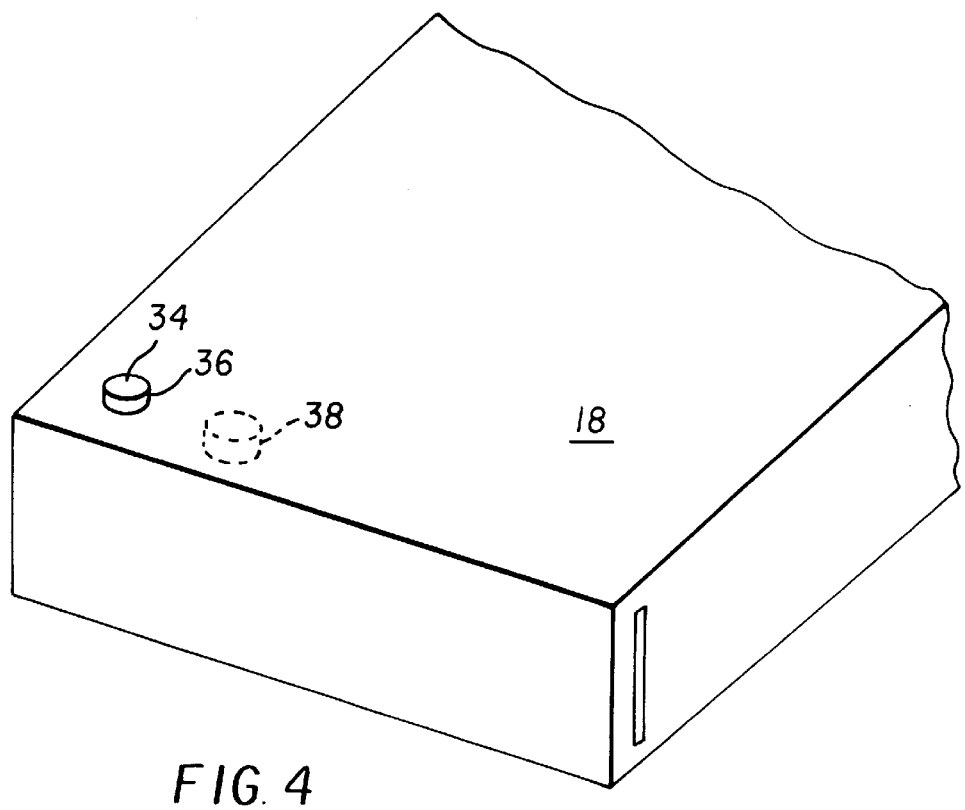
FIG. 4 shows a fragmentary view of a cassette including a feature of the type shown in FIG. 3.

FIGS. 3 and 4 show an alternative embodiment of the invention in which a single sensor is used not only to detect a cassette and to confirm that the closure has been closed, but also to detect that the cassette is properly oriented and/or includes the correct web material. A feature is provided on the cassette, such as a local, off-center, protruding feature 36, which will be engaged by actuator arm 32 only if the cassette has been properly oriented within chamber 12. If different types of web material may be used in the apparatus, the protrusion may be located at different off-center positions on the cassettes for the different materials, such as an alternate protruding feature 38, shown in dashed lines. In the latter instance, separate sensors would be provided on the closure for each type of web material, one sensor at each location of a protruding feature; however, only a single sensor would be functional at a given time.

Figure 5:
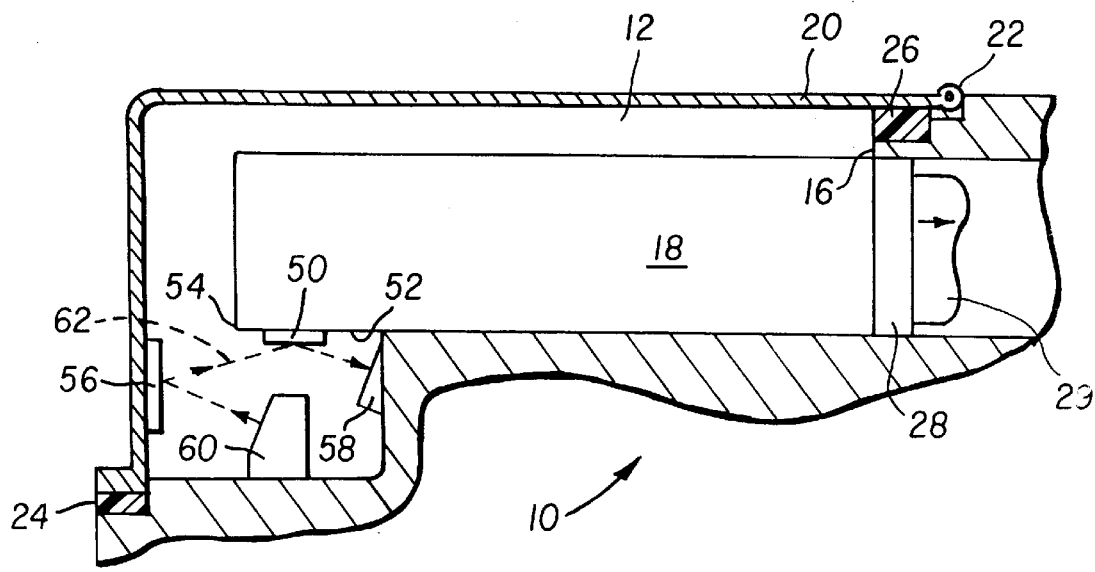
FIG. 5 shows a fragmentary sectional view of a photographic apparatus of the type shown in FIG. 2, wherein the cassette, closure and apparatus embody features of an optical sensor to detect both the presence of a cassette and the closed position of the closure.
Figure 6:
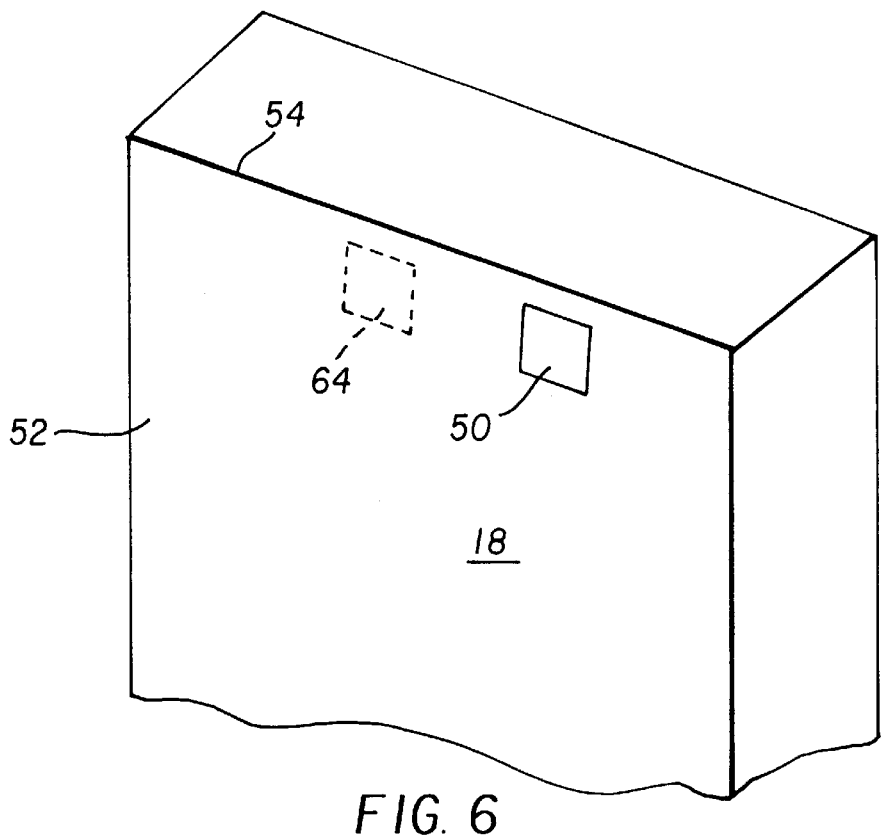
FIG. 6 shows a fragmentary view of a cassette including a reflective feature of the type shown in FIG. 5.

Optical sensors also may be used in accordance with the invention. As shown in FIGS. 5 and 6, a strip 50 of reflective tape may be mounted off-center on an under surface 52 of cassette 18, just inside a bottom edge 54. A similar strip 56 of reflective tape may be mounted on the inside of cover 20. A photocell or similar sensor 58 may be mounted in the apparatus to receive a beam of light emitted by an infrared light source 60 mounted in the apparatus, after the beam has reflected sequentially from strips 56 and 50 along a light path 62. Thus, a signal from a single sensor 58 will indicate that a cassette is installed and the closure is closed. By locating the reflective strips, sensor and light source along the width of the cassette at positions corresponding to a characteristic of the web material in the cassette, such as at the alternate cassette location 64 shown in dashed lines in FIG. 6, the apparatus also will indicate whether the cassette contains material of the proper characteristic.

Figure 7:
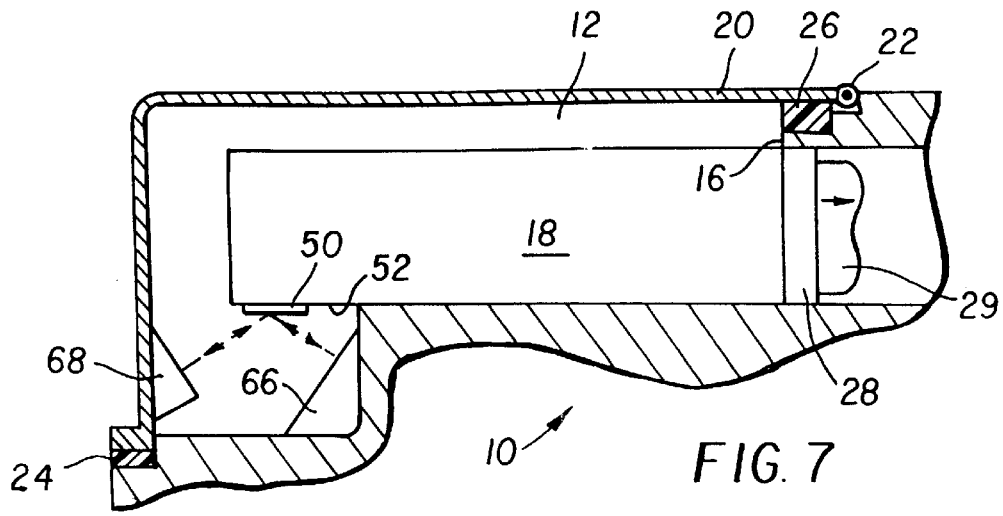
FIG. 7 shows a fragmentary view of a cassette including a first alternative arrangement of the optical sensor.
Figure 8:
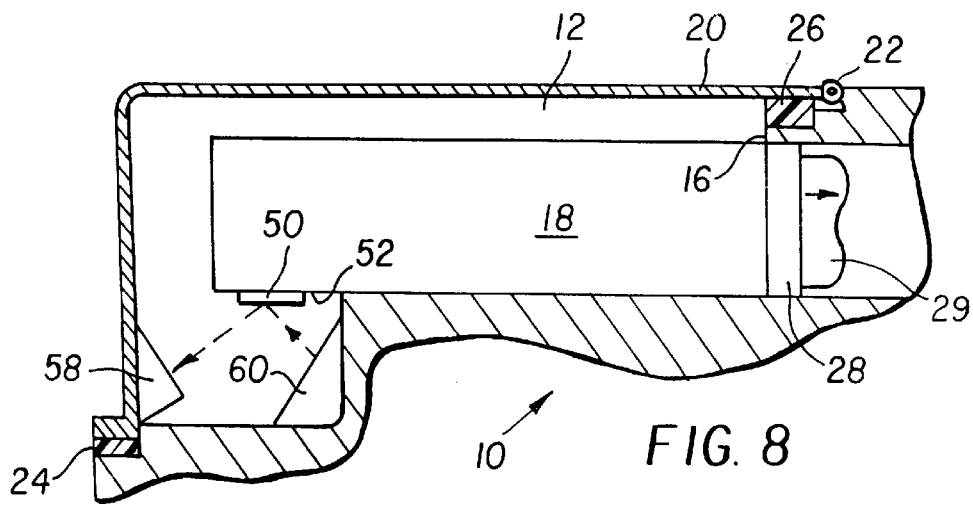
FIG. 8, shows a fragmentary view of a cassette including a second alternative arrangement of the optical sensor.
Figure 9:
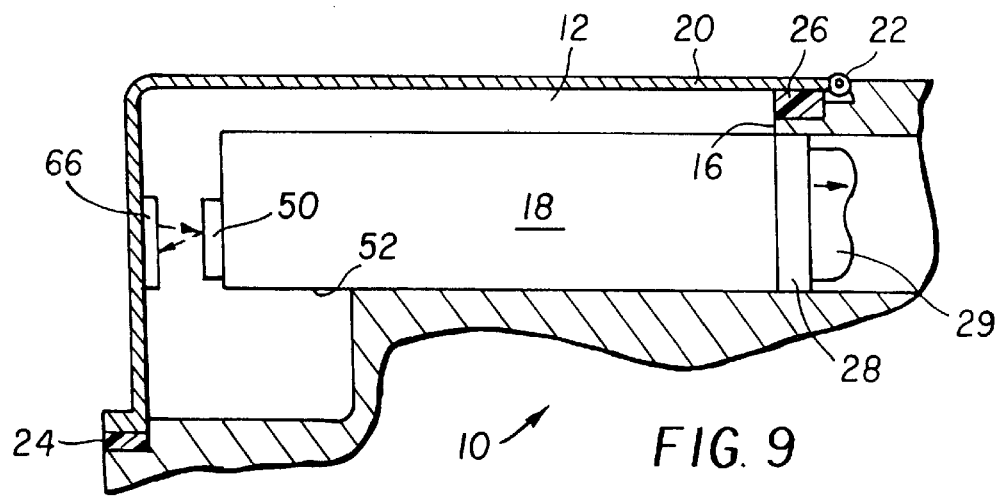
FIG. 9 shows a fragmentary view of a cassette including a third alternative arrangement of the optical sensor.

FIGS. 7 to 9 show alternative arrangements of the optical sensor. In the embodiment of FIG. 7, a combined transmitter/receiver 66 is mounted in the chamber in position to direct its beam toward reflective tape 50 mounted on the cassette, which reflects the beam toward a reflector 68 mounted on closure 20. The beam then reflects back along essentially the same path to transmitter/receiver 66. In the embodiment of FIG. 8, photocell 58 is mounted on closure 20 to receive light from source 60 mounted in the chamber, after reflection from reflective tape 50. In the embodiment of FIG. 9, transmitter/receiver 66 is mounted on the closure to transmit light to, and receive reflected light from, reflective tape 50 on the cassette.

Other sensor types may be used without departing from the scope of the invention. For example, a magnet may be supported in a wall of the cassette and a Hall effect sensor may be mounted on the closure. Or a metal tag may be supported by the cassette and a proximity sensor may be mounted on the closure. The magnet or metal tag may be located off-center to facilitate confirmation of the contents and orientation of the cassette using a single sensor.

Parts List

10 . . . photographic apparatus
12 . . . cassette chamber
14, 16 . . . locating surfaces for 12
18 . . . cassette for light-sensitive web material, such as photographic film or paper
20 . . . closure for 12
22 . . . hinge for 20
24, 26 . . . light-tight gaskets for 20
28 . . . light-lock for web material passing into 10
29 . . . leading end of web material from 18

30 ... micro-switch, normally open or normally closed
32 ... actuator arm of 30
34 ... contact surface of 18
35 ... indicating means responsive to opening and closing of 30
36 ... protruding feature of 18
38 ... alternate protruding feature of 18
50 ... strip of reflective tape on 52
52 ... bottom surface of 18
54 ... bottom edge of 18
56 ... strip of reflective tape on 20
58 ... photocell
60 ... light source
62 ... beam path
64 ... alternate strip of reflective tape
66 ... combined transmitter/receiver
68 ... reflector While my invention has been shown and described with reference to particular embodiments thereof, those skilled in the art will understand that other variations in form and detail may be made without departing from the scope and spirit of my invention.

Having thus described our invention in sufficient detail to enable those skilled in the art to make and use it, we claim as new and desire to secure Letters Patent for:

1. Apparatus for using light-sensitive web material, comprising:
a chamber in the apparatus, for receiving a cassette of the material;
a light-tight closure for the chamber;
only one sensor, actuated by cooperation of both the closure and a cassette upon closing of the closure, for sensing both that the cassette is present in the chamber and that the chamber is closed by the closure and for producing a signal; and
an indicator responsive to the signal to indicate either that the cassette is not present, or that the chamber is not closed, or both;
wherein the sensor is a micro-switch mounted on the closure, the micro-switch having an actuator arm which contacts a surface of a cassette when the chamber is closed.

2. Apparatus for using light-sensitive web material, comprising:
a chamber in the apparatus, for receiving a cassette of the material;
a light-tight closure for the chamber;
only one sensor, actuated by cooperation of both the closure and a cassette upon closing of the closure, for sensing both that the cassette is present in the chamber and that the chamber is closed by the closure and for producing a signal; and
an indicator responsive to the signal to indicate either that the cassette is not present, or that the chamber is not closed, or both;
wherein a cassette is installed in the chamber; and the sensor comprises a first reflective member mounted on the closure, a second reflective member mounted on the cassette; a source of light for directing a beam from the first reflective member to the second; and means for detecting that the beam has reflected from both reflective members.

3. Apparatus for using light-sensitive web material, comprising:
a chamber in the apparatus, for receiving a cassette of the material;
a light-tight closure for the chamber;
only one sensor, actuated by cooperation of both the closure and a cassette upon closing of the closure, for sensing both that the cassette is present in the chamber and that the chamber is closed by the closure and for producing a signal; and an indicator responsive to the signal to indicate either that the cassette is not present, or that the chamber is not closed, or both;
wherein a cassette is installed in the chamber; and the sensor comprises a first reflective member mounted on the closure, a second reflective member mounted on the cassette and an optical transmitter/receiver for directing a beam from the first reflective member to the second and for receiving a reflected beam.

4. Apparatus for using light-sensitive web material, comprising:
a chamber in the apparatus, for receiving a cassette of the material;
a light-tight closure for the chamber;
only one sensor, actuated by cooperation of both the closure and a cassette upon closing of the closure, for sensing both that the cassette is present in the chamber and that the chamber is closed by the closure and for producing a signal; and
an indicator responsive to the signal to indicate either that the cassette is not present, or that the chamber is not closed, or both;
wherein a cassette is installed in the chamber; and the sensor comprises a reflective member mounted on the cassette, a photocell mounted on the closure and an optical transmitter mounted in the chamber for directing a beam to the reflective member and from the reflective member to the photocell.

5. Apparatus for using light-sensitive web material, comprising:
a chamber in the apparatus, for receiving a cassette of the material;
a light-tight closure for the chamber;
only one sensor, actuated by cooperation of both the closure and a cassette upon closing of the closure, for sensing both that the cassette is present in the chamber and that the chamber is closed by the closure and for producing a signal; and
an indicator responsive to the signal to indicate either that the cassette is not present, or that the chamber is not closed, or both:
wherein a cassette is installed in the chamber; and the sensor comprises a reflective member mounted on the cassette and an optical transmitter/receiver mounted on the closure for directing a beam to the reflective member and for receiving a reflected beam.

6. Apparatus for using light-sensitive web material, comprising:
a chamber in the apparatus, for receiving a cassette of the material;
a light-tight closure for the chamber;
only one sensor, actuated by cooperation of both the closure and a cassette upon closing of the closure, for sensing both that the cassette is present in the chamber and that the chamber is closed by the closure and for producing a signal; and
an indicator responsive to the signal to indicate either that the cassette is not present, or that the chamber is not closed, or both;

wherein a cassette is installed in the chamber, the cassette having a single, off-center exterior feature sensed by the sensor when the cassette is installed, the cassette containing web material having a desired characteristic, and the chamber is closed; and wherein the exterior feature is optically reflective.

7. Apparatus according to claim 6, wherein the exterior feature is a strip of optical reflective tape.

* * * * *